(12) United States Patent
Baccouche et al.

(10) Patent No.: US 11,208,148 B2
(45) Date of Patent: Dec. 28, 2021

(54) NODE INTEGRATED DEFLECTOR FOR A VEHICLE

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Michael Musa Azzouz, Dearborn Heights, MI (US); Saied Nusier, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 15/931,835

(22) Filed: May 14, 2020

(65) Prior Publication Data

US 2021/0354759 A1 Nov. 18, 2021

(51) Int. Cl.
*B62D 21/15* (2006.01)

(52) U.S. Cl.
CPC .................................. *B62D 21/152* (2013.01)

(58) Field of Classification Search
CPC .............................. B62D 21/152; B62D 21/15
See application file for complete search history.

(56) References Cited

U.S. PATENT DOCUMENTS

| 9,126,629 | B2 | 9/2015 | Gilbert et al. | |
|---|---|---|---|---|
| 10,315,700 | B2 | 6/2019 | Coppuck | |
| 2017/0217497 | A1* | 8/2017 | Chiang | B62D 21/152 |
| 2017/0297519 | A1* | 10/2017 | Canobbio | B62D 21/152 |
| 2018/0148101 | A1* | 5/2018 | Burbulla | B62D 21/152 |
| 2018/0194399 | A1* | 7/2018 | Grattan | B62D 21/05 |
| 2020/0086921 | A1* | 3/2020 | Watanabe | B62D 21/11 |

FOREIGN PATENT DOCUMENTS

| DE | 102014018760 B3 | 2/2016 |
|---|---|---|
| DE | 102015112586 A1 | 2/2017 |
| FR | 3081799 A1 | 12/2019 |

\* cited by examiner

*Primary Examiner* — Lori L Lyjak
(74) *Attorney, Agent, or Firm* — David Coppiellie; Carlson, Gaskey & Olds, P.C.

(57) ABSTRACT

A vehicle frame assembly includes, among other things, a main rail and a node assembly attached to the main rail. The node assembly includes a forward mounting member, a rear mounting member, and a deflector extending between the forward mounting member and rear mounting member. When a load exceeds a threshold load that is applied to a front of a vehicle, the deflector is configured to engage a tire and deflect the tire from entering a forward vehicle area.

20 Claims, 3 Drawing Sheets

NODE INTEGRATED DEFLECTOR FOR A VEHICLE

TECHNICAL FIELD

This disclosure relates generally to body structures of a vehicle and, more particularly, to a node integrated deflector that can deflect a tire from entering a forward vehicle area during frontal contact.

BACKGROUND

Vehicles designs can undergo many tests. One such test, the Small Offset Rigid Barrier (SORB) test, simulates small offset frontal contact against a rigid barrier. During the SORB test, an input load is applied to a front of the vehicle at a position outboard of one of the main rails.

SUMMARY

A vehicle frame assembly according to an exemplary aspect of the present disclosure includes, among other things, a main rail and a node assembly attached to the main rail. The node assembly includes a forward mounting member, a rear mounting member, and a deflector extending between the forward mounting member and rear mounting member. When a load exceeds a threshold load that is applied to a front of a vehicle, the deflector is configured to engage a tire and deflect the tire from entering a forward vehicle area.

In a further embodiment of the foregoing vehicle frame assembly, the forward mounting member is directly coupled to the main rail.

In a further embodiment of any of the foregoing vehicle frame assemblies, the rear mounting member is coupled to a vehicle mid-frame member.

In a further embodiment of any of the foregoing vehicle frame assemblies, the node assembly includes a second forward mounting member that is coupled to a lower rail.

In a further embodiment of any of the foregoing vehicle frame assemblies, the lower rail extends underneath the main rail.

In a further embodiment of any of the foregoing vehicle frame assemblies, the deflector is integrally formed with the node assembly as one piece.

In a further embodiment of any of the foregoing vehicle frame assemblies, the node assembly comprises a three dimensional printed component.

In a further embodiment of any of the foregoing vehicle frame assemblies, a first member extends rearward from the forward mounting member and a second member is spaced apart from the first member and extends rearward from the forward mounting member at an outboard location relative to the first member, and wherein the deflector extends outwardly of the second member.

In a further embodiment of any of the foregoing vehicle frame assemblies, the deflector comprises an outer engagement surface that engages the tire when the threshold load is exceeded and deflects the tire from entering the forward vehicle area.

In a further embodiment of any of the foregoing vehicle frame assemblies, when the tire is separated from the vehicle, the outer engagement surface is configured to engage a barrier surface and provides a pivot area to rotate the vehicle and rebound the vehicle away from the barrier surface.

In a further embodiment of any of the foregoing vehicle frame assemblies, the main rail includes a rear end that is coupled to the node assembly and a forward end that is associated with a can member that is coupled to a bumper.

In a further embodiment of any of the foregoing vehicle frame assemblies, the node assembly is positioned adjacent to a well wheel area within the vehicle.

In a further embodiment of any of the foregoing vehicle frame assemblies, the forward mounting member is directly coupled to the main rail and the rear mounting member is coupled to a vehicle mid-frame member, and wherein the node assembly includes a second forward mounting member that is coupled to a lower rail that extends underneath the main rail, and wherein the deflector is integrally formed with the node assembly as one piece.

A vehicle frame assembly according to another exemplary aspect of the present disclosure includes, among other things, a main rail and a node assembly attached to the main rail. The node assembly includes an upper forward mounting member, a lower forward mounting member, a rear mounting member, and a deflector extending between the upper forward mounting member and rear mounting member. When a load exceeds a threshold load that is applied to a front of a vehicle, the deflector is configured to engage a tire and deflect the tire from entering a forward vehicle area.

In a further embodiment of any of the foregoing vehicle frame assemblies, the upper forward mounting member is directly coupled to the main rail, the rear mounting member is coupled to a vehicle mid-frame member, and the lower forward mounting member is coupled to a lower rail that extends underneath the main rail.

In a further embodiment of any of the foregoing vehicle frame assemblies, a first member extends rearward from the upper forward mounting member and a second member is spaced apart from the first member and extends rearward from the upper forward mounting member at an outboard location relative to the first member, and wherein the deflector extends outwardly of the second member and comprises an outer engagement surface that engages the tire when the threshold load is exceeded and deflects the tire from entering the forward vehicle area, and when the tire is separated from the vehicle, the outer engagement surface is configured to engage a barrier surface and provides a pivot area to rotate the vehicle and rebound the vehicle away from the barrier surface.

A vehicle frame load absorbing method according to yet another exemplary aspect of the present disclosure includes, among other things, providing a node assembly having a forward mounting member directly coupled to a main rail, a rear mounting member coupled to a vehicle mid-frame member, and a deflector extending between the forward mounting member and rear mounting member; applying a load that exceeds a threshold load to a front of a vehicle; engaging an outer engagement surface of the deflector with a tire when the threshold load is exceeded to deflect the tire from entering a forward vehicle area; and when the tire is subsequently separated from the vehicle, engaging the outer engagement surface of the deflector with a barrier surface to provide a pivot area to rotate the vehicle and rebound the vehicle away from the barrier surface.

Another example of the foregoing method includes integrally forming the deflector, the forward mounting member, and the rear mounting member as a single-piece component.

In another example of any of the foregoing methods includes forming the single-piece component using three dimensional printing.

In another example of any of the foregoing methods, the node assembly includes a second forward mounting member that is coupled to a lower rail that extends underneath the main rail.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a vehicle frame having a node integrated deflector that can absorb input kinetic energy when a frontal contact load is applied to a vehicle, particularly a load applied outboard a main rail of the vehicle frame. During, for example, a Small Offset Rigid Barrier (SORB) test, the node integrated deflector deflects a tire from entering a forward vehicle area during frontal contact and redirect loads such that the vehicle rotates around the node integrated deflector and rebounds away from the rigid barrier.

Figure 1:
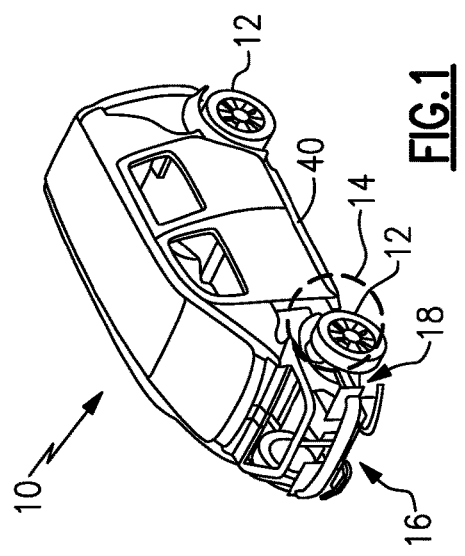
FIG. 1 is a top, partially section view of a vehicle incorporating a node integrated deflector according to an exemplary aspect of the present disclosure.
Figure 2:
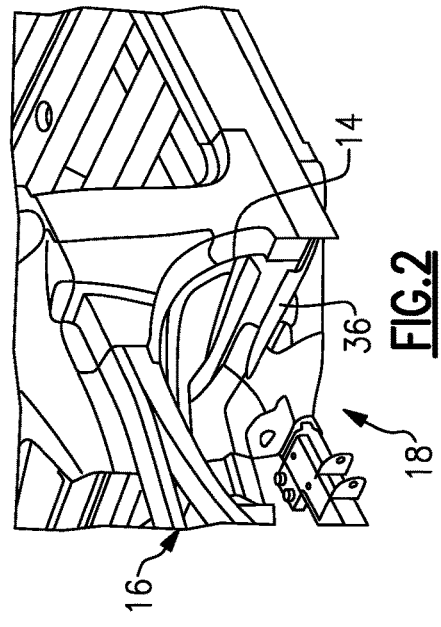
FIG. 2 illustrates an enlarged perspective view of the node integrated deflector in a wheel well area of FIG. 1.

With reference to FIG. 1, a vehicle 10 includes a plurality of tires 12 that are located within wheel well areas 14. The vehicle 10 includes a vehicle frame assembly 16 having an integrated node assembly 18 located adjacent a front wheel well area 14 as shown in FIG. 2. The integrated node assembly 18 is on a driver side of the vehicle 10 and another integrated node assembly (not shown), is disposed on a passenger side of the vehicle 10.

Figure 3:
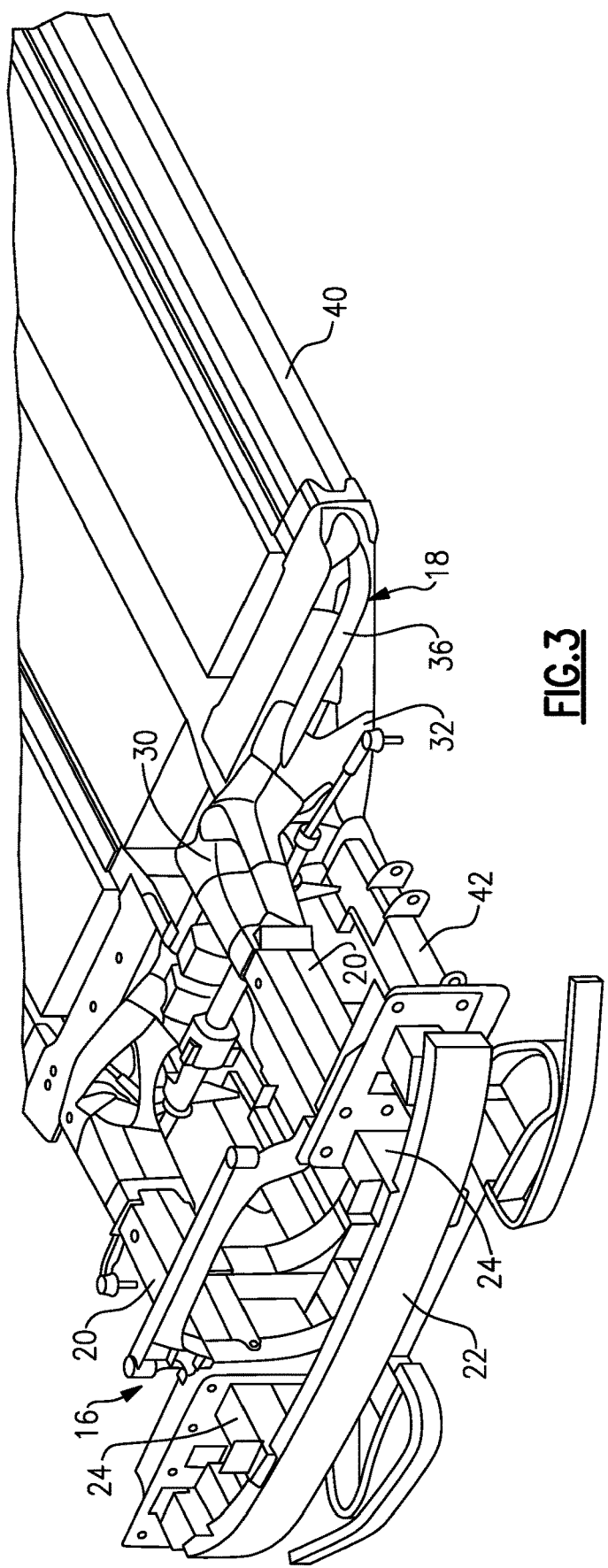
FIG. 3 illustrates a perspective view of the node integrated deflector of FIG. 1.

As shown in FIG. 3, the integrated node assembly 18 is disposed on a laterally outboard side of a main rail 20 of the vehicle 10. The other integrated node assembly is disposed on a laterally outboard side of the main rail 20 on the passenger side.

A bumper 22 of the vehicle 10 extends laterally across the vehicle 10 and partially outboard of the main rails 20. A can member 24 is disposed between the bumper 22 and each main rail 20. The can member 24 can help to absorb loads applied to a front of the vehicle 10 through the bumper 22.

The SORB test replicates the vehicle 10 making contact with a rigid barrier 26 (FIG. 6B) that is outboard of the main rail 20. During the SORB test, the can member 24 can absorb some load. However, in the exemplary embodiment, the integrated node assembly 18 is also utilized to absorb and redirect the load and to minimize movement of the tire 12 and/or rigid barrier 26 into the vehicle 10. The integrated node assembly 18 can also redirect the applied load during the SORB test to the main rail 20 while additionally helping to slide or push the vehicle 10 away from the rigid barrier 26.

Figure 4:
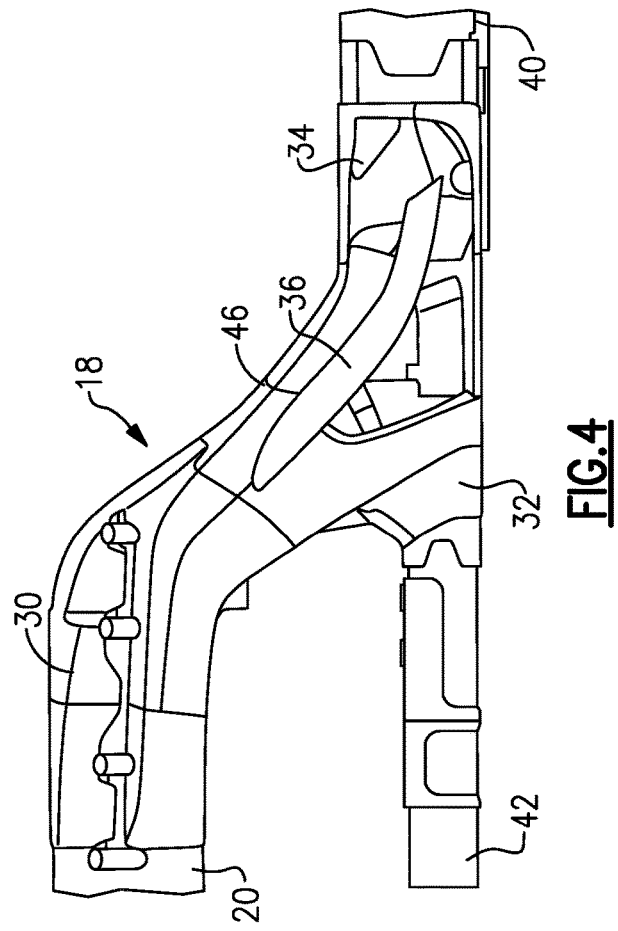
FIG. 4 illustrates a side view of the node integrated deflector of FIG. 1.

With reference now to FIGS. 2-5, the integrated node assembly 18 in the exemplary embodiment includes, among other things, an upper forward mounting member 30, a lower forward mounting member 32, a rear mounting member 34, and a deflector 36. The deflector 36 extends between the upper forward mounting member 30 and rear mounting member 34 as shown in FIG. 4. When a load exceeds a threshold load that is applied to a front of the vehicle 10, during the SORB test for example, the deflector 36 is configured to engage the tire 12 and deflect the tire 12 from entering a forward vehicle area. In one exemplary embodiment, the forward vehicle area encompasses a toe-pan, pillar, dash, etc., area.

Figure 5:
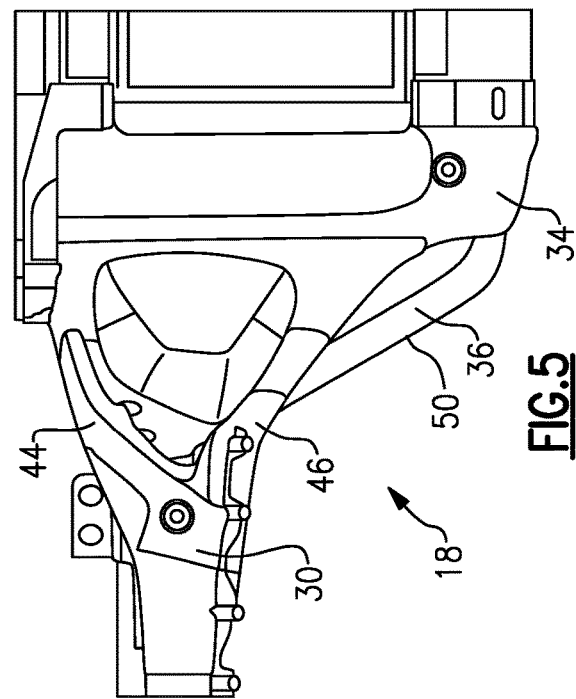
FIG. 5 illustrates a top view of the node integrated deflector of FIG. 1.

In one example, the upper forward mounting member 30 is directly coupled to the main rail 20, the rear mounting member 34 is coupled to a vehicle mid-frame member 40, and the lower forward mounting member 32 is coupled to a lower rail 42 that extends underneath the main rail 20. The upper forward mounting member 30 has a forward end that is directly coupled to the main rail 20. The upper forward mounting member 30 transitions to the rear mounting member 34 via a first member 44 that extends rearward and a second member 46 that is spaced apart from the first member 44 by an open area. The second member 46 also extends rearward and is at an outboard location relative to the first member 44. The first 44 and second 46 members thus each have a forward portion that connects to the upper forward mounting member 30 and a rear portion that connects to the rear mounting member 34 as shown in FIG. 5. The deflector 36 extends outwardly of the second member 46 and comprises an outer engagement surface 50 that engages the tire 12 when the threshold load is exceeded.

The first 44 and second 46 members extend downward and rearward of the upper forward mounting member 30 to connect to the rear mounting member 34, which is vertically lower relative to ground level than the upper forward mounting member 30. The rear mounting member 34 is configured to connect to the mid-frame of the vehicle 10.

In one example, the deflector 36 is integrally formed with the node assembly 18 as a single-piece component. In one exemplary embodiment, the node assembly 18 comprises a three dimensional printed component such that the upper forward mounting member 30, lower forward mounting member 32, rear mounting member 34, and deflector 36 comprises a unitary, integrated single-piece component. Any type of three dimensional printing technology can be used to form the component. For example, Selective Laser Melting (SLM), Direct Metal Laser Melting (DMLM), and Laser Powder Bed Fusion (LPBF), can be used to form the node assembly 18. By integrating the deflector 36 into the node assembly 18, no additional parts are required and the assembly fits within existing packaging/tire envelope areas.

Figure 6C:
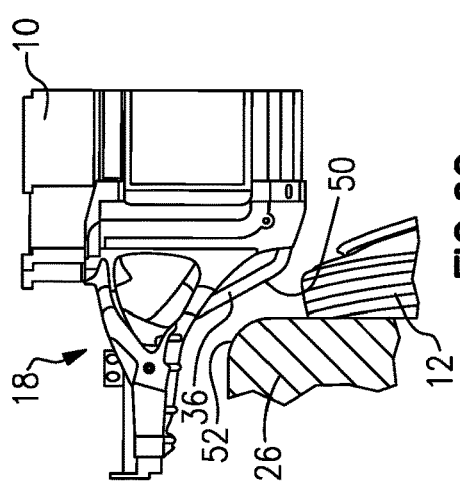
FIG. 6C is similar to FIG. 6B but illustrates the tire being separated from the vehicle.
Figure 6B:
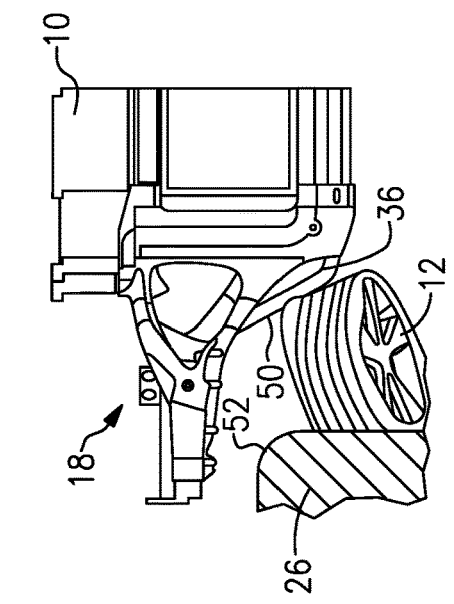
FIG. 6B is similar to FIG. 6A but illustrates a tire in contact with the rigid barrier and the node integrated deflector.
Figure 6A:
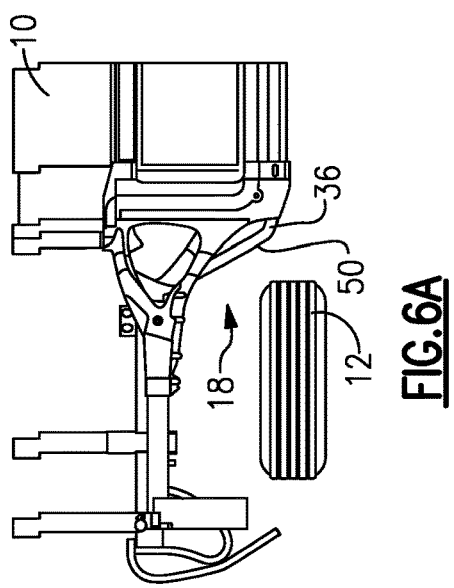
FIG. 6A illustrates a top view of the node integrated deflector before the vehicle contacts a rigid barrier.
Figure 6E:
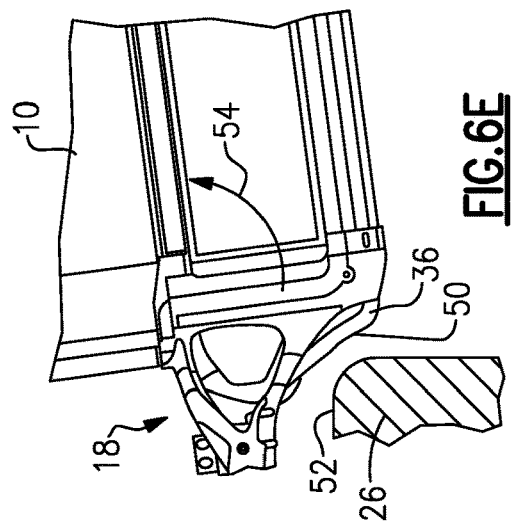
FIG. 6E is similar to FIG. 6D but illustrates the vehicle rotating around the node integrated deflector and rebounding away from the rigid barrier.
Figure 6D:
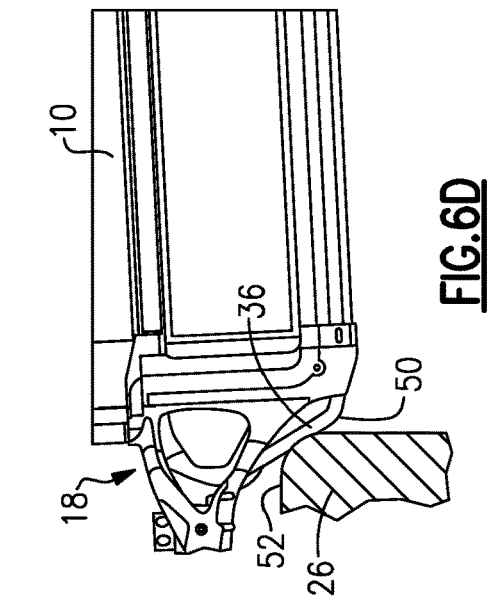
FIG. 6D is similar to FIG. 6C but illustrates the rigid barrier in contact with the node integrated deflector.

With reference now to FIGS. 6A and 6E, a rigid barrier 26 can be utilized in connection with a SORB test. FIG. 6A illustrates the node assembly 18 before the tire 12 contacts the rigid barrier 26. As the rigid barrier 26 and the front area of the vehicle 10 are moved relatively toward each other, the rigid barrier 26 contacts the tire 12, which is then pushed into contact with the node integrated deflector 36 as shown in FIG. 6B. The outer engagement surface 50 of the deflector 36 tire 12 then forces the tire 12 to slide in an outboard direction until the tire 12 is separated from the vehicle 10 as shown in FIG. 6C. Once the tire 12 is out of the way, the outer engagement surface 50 of the deflector 36 contacts an outer surface 52 of the rigid barrier 26 as shown in FIG. 6D. The deflector 36 is configured such that the outer engagement surface 50 provides a pivot contact area that causes the vehicle 10 to rotate, as indicated at 54 in FIG. 6E, and rebound away from the rigid barrier 26.

Thus, the node assembly 18 includes an integrated deflector 36 that serves to deflect the tire 12 from entering a forward vehicle area, and when the tire is separated from the vehicle, the outer engagement surface 50 of the deflector 36 is configured to engage the barrier surface 52 to provide a pivot area to rotate the vehicle 10 and rebound the vehicle 10 away from the barrier 26.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle frame assembly, comprising:
   a main rail; and
   a node assembly attached to the main rail, the node assembly including:
   at least one forward mounting member,
   a rear mounting member, and
   a deflector extending between the at least one forward mounting member and the rear mounting member, and wherein, when a load exceeds a threshold load that is applied to a front of a vehicle, the deflector is configured to engage a tire and deflect the tire from entering a forward vehicle area.

2. The vehicle frame assembly of claim 1, wherein the at least one forward mounting member is directly coupled to the main rail.

3. The vehicle frame assembly of claim 1, wherein the rear mounting member is coupled to a vehicle mid-frame member.

4. The vehicle frame assembly of claim 1, wherein the at least one forward mounting member comprises a first forward mounting member attached to the main rail and a second forward mounting member that is coupled to a lower rail.

5. The vehicle frame assembly of claim 4, wherein the lower rail extends underneath the main rail, and wherein the first forward mounting member comprises an upper forward mounting member and the second forward mounting member comprises a lower forward mounting member.

6. The vehicle frame assembly of claim 1, wherein the deflector is integrally formed with the node assembly as one piece.

7. The vehicle frame assembly of claim 6, wherein the node assembly comprises a three dimensional printed component.

8. The vehicle frame assembly of claim 1, including a first member that extends rearward from the at least one forward mounting member and a second member that is spaced apart from the first member and extends rearward from the at least one forward mounting member at an outboard location relative to the first member, and wherein the deflector extends outwardly of the second member.

9. The vehicle frame assembly of claim 1, wherein the deflector comprises an outer engagement surface that engages the tire when the threshold load is exceeded and deflects the tire from entering the forward vehicle area.

10. The vehicle frame assembly of claim 9, wherein when the tire is separated from the vehicle, the outer engagement surface is configured to engage a barrier surface and provides a pivot area to rotate the vehicle and rebound the vehicle away from the barrier surface.

11. The vehicle frame assembly of claim 1, wherein the main rail includes a rear end that is coupled to the node assembly and a forward end that is associated with a can member that is coupled to a bumper.

12. The vehicle frame assembly of claim 1, wherein the node assembly is positioned adjacent to a well wheel area within the vehicle.

13. The vehicle frame assembly of claim 1, wherein the at least one forward mounting member is directly coupled to the main rail and the rear mounting member is coupled to a vehicle mid-frame member, and wherein the at least one forward mounting member comprises a first forward mounting member attached to the main rail and a second forward mounting member that is coupled to a lower rail that extends underneath the main rail, and wherein the deflector is integrally formed with the node assembly as one piece.

14. A vehicle frame assembly, comprising:
   a main rail; and
   a node assembly attached to the main rail, the node assembly including:
   an upper forward mounting member,
   a lower forward mounting member,
   a rear mounting member, and
   a deflector extending between the upper forward mounting member and rear mounting member, and wherein, when a load exceeds a threshold load that is applied to a front of a vehicle, the deflector is configured to engage a tire and deflect the tire from entering a forward vehicle area.

15. The vehicle frame assembly of claim 14, wherein the upper forward mounting member is directly coupled to the main rail, the rear mounting member is coupled to a vehicle mid-frame member, and the lower forward mounting member is coupled to a lower rail that extends underneath the main rail.

16. The vehicle frame assembly of claim 14, including a first member that extends rearward from the upper forward mounting member and a second member that is spaced apart from the first member and extends rearward from the upper forward mounting member at an outboard location relative to the first member, and wherein the deflector extends outwardly of the second member and comprises an outer engagement surface that engages the tire when the threshold load is exceeded and deflects the tire from entering the forward vehicle area, and when the tire is separated from the vehicle, the outer engagement surface is configured to engage a barrier surface and provides a pivot area to rotate the vehicle and rebound the vehicle away from the barrier surface.

17. A vehicle frame load absorbing method, comprising:
providing a node assembly having at least one forward mounting member directly coupled to a main rail, a rear mounting member coupled to a vehicle mid-frame member, and a deflector extending between the at least one forward mounting member and the rear mounting member;
applying a load that exceeds a threshold load to a front of a vehicle;
engaging an outer engagement surface of the deflector with a tire when the threshold load is exceeded to deflect the tire from entering a forward vehicle area; and
when the tire is subsequently separated from the vehicle, engaging the outer engagement surface of the deflector with a barrier surface to provide a pivot area to rotate the vehicle and rebound the vehicle away from the barrier surface.

18. The vehicle frame load absorbing method of claim 17, including integrally forming the deflector, the at least one forward mounting member, and the rear mounting member as a single-piece component.

19. The vehicle frame load absorbing method of claim 18, including forming the single-piece component using three dimensional printing.

20. The vehicle frame load absorbing method of claim 17, wherein the at least one forward mounting member comprises a first forward mounting member attached to the main rail and a second forward mounting member that is coupled to a lower rail that extends underneath the main rail, and wherein the first forward mounting member comprises an upper forward mounting member and the second forward mounting member comprises a lower forward mounting member.

* * * * *